UNITED STATES PATENT OFFICE.

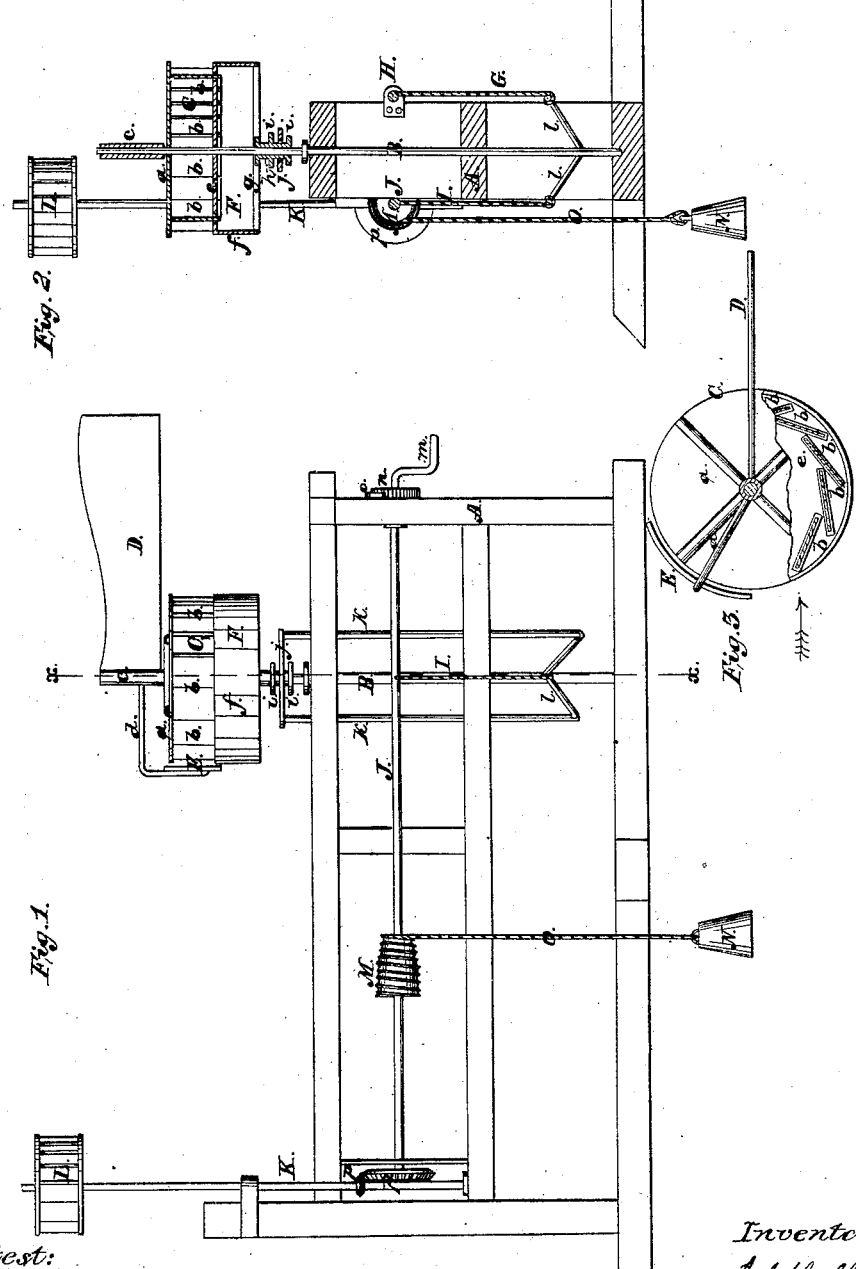

JOHN A. HUBBARD, OF WEST HOULTON, MAINE.

IMPROVEMENT IN WIND-WHEELS.

Specification forming part of Letters Patent No. 50,003, dated September 19, 1865.

*To all whom it may concern:*

Be it known that I, JOHN A. HUBBARD, of West Houlton, in the county of Aroostook and State of Maine, have invented a new and Improved Wind-Wheel; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, a transverse vertical section of the same, taken in the line $x$ $x$, Fig. 1; and Fig. 3, a detached plan of the wind-wheel, partly in section.

Similar letters of reference indicate corresponding parts.

This invention relates to a new and improved device for obtaining power from the wind; and it consists in the employment or use of a wind-wheel provided with a vane and shield and with oblique fans or buckets, and arranged with a gate in such a manner that the speed of the wheel may be regulated, as desired, and the pin made to act efficiently upon it.

The invention also consists in a novel means for operating the gate and for stopping the wind-wheel when required.

A represents a framing, which may be constructed in any proper manner to support the working parts; and B is a shaft fitted vertically in said framing, and having a wind-wheel, C, on its upper end, said wheel being composed of a horizontal circular plate, $a$, with wings or buckets $b$ placed obliquely between them, as shown clearly in Fig. 3.

D is a vane, which is placed loosely on the upper end of the shaft B, above the wheel, and has a shield, E, attached to its socket $c$, by an arm, $d$. This shield is curved, forming a portion of a circle which covers a portion of the buckets of the wheel, (those at the left side, which face the wind,) so as to cause the latter to act in the most efficient manner upon or against the former. (See Fig. 3, the arrow indicating the direction of the wind.) The wind by means of the vane D keeps the shield in a proper relative position with the wheel at all times.

F represents a gate, which is composed of a circular plate, $e$, slotted to allow the buckets of the wheel to pass through, and having a pendent flange, $f$, extending down all around it, so that the buckets of the wheel will be fully covered or inclosed when the gate is fully raised. The gate F is provided with a horizontal arm or cross-bar, $g$, attached centrally to the lower edge of the flange $f$, and having a tube, $h$, at its center, which is fitted loosely on the shaft B of the wheel, so that it may slide freely up and down thereon, and the tube $h$ has two shoulders, $i$ $i$, attached to it, between which a cross-bar, $j$, is fitted, the latter being attached near its ends to vertical shafts K K, the lower ends of which are connected by arms $l$ $l'$.

One of the arms, $l$, is connected by a cord, G, with a shaft, H, in the framing, having a crank, $m$, at one end, and a ratchet, $n$, into which a pawl, $o$, engages, and the other arm, $l'$, is connected by a cord, I, with a horizontal shaft, J, which is connected at one end by gears $p$ to a vertical shaft, K, having a small wind-wheel, L, upon its upper end.

On the horizontal shaft J there is placed a cone, M, to the small end of which a weight, N, is attached by a cord, O.

The operation is as follows: The wind will rotate the wheel C, striking the buckets $b$ at the right-hand side of the shield E, the vane, as previously stated, keeping the shield in a proper relative position with the wheel to always admit of the wind acting in this way upon the wheel. The small wheel L is "balanced," if it may be so termed, by the weight N—that is to say, said weight will keep the wheel L stationary under light or moderate breezes, but when the wind has such a velocity that it will drive the wheel C at an undue speed, the wheel L will be turned and motion communicated to the shaft J by the gears $p$, and the weight N will be wound upon the cone M until the increasing resistance of the weight caused by the gradually-increasing diameter of the cone M will stop wheel L. The rotation of shaft J raises the gate F through the medium of the cord I, and the buckets $b$, therefore, are partially inclosed, and in consequence of presenting a less area to the wind the wheel cannot be acted upon with the full power of the wind. As the latter diminishes in velocity the weight N will fall until an equilibrium is established between it and the wheel L, and the gate F also falls, exposing more of the buckets *b*. Hence it will be seen that the wheel C will rotate with a uniform speed, however much the wind may vary in velocity.

In order to stop the wheel entirely the shaft I is rotated by hand and the gate raised so as to completely inclose the wheel C, the gate being held or retained in consequence of the pawl *o* engaging with the ratchet *n*.

Having thus described my invention, I claim as new and desire to secure by Letters Patent—

1. A wind-wheel provided with oblique buckets *b*, in connection with a vane, D, having a shield, E, attached and arranged to operate in the manner substantially as and for the purpose set forth.

2. The gate F and wind-wheel C, constructed, arranged, and operating in the manner substantially as and for the purpose herein set forth.

3. The supplementary wind-wheel L, combined and arranged with the shaft J and with the cone M, having the weight N attached and connected with the gate F, substantially as and for the purpose specified.

JOHN A. HUBBARD.

Witnesses:
LEVI WHITTIER,
R. M. MANSED.